US012023292B2

(12) United States Patent
Holschuh et al.

(10) Patent No.: US 12,023,292 B2
(45) Date of Patent: Jul. 2, 2024

(54) DYNAMIC ANCHORING USING LOCALIZED ACTIVE COMPRESSION

(71) Applicant: Regents of the University of Minnesota, Minneapolis, MN (US)

(72) Inventors: Bradley Thomas Holschuh, Minneapolis, MN (US); Lucy Elizabeth Dunne, Minneapolis, MN (US); Rachael Margaret Granberry, Minneapolis, MN (US); Julianna Abel, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 17/301,285

(22) Filed: Mar. 30, 2021

(65) Prior Publication Data

US 2021/0301432 A1 Sep. 30, 2021

Related U.S. Application Data

(60) Provisional application No. 63/001,895, filed on Mar. 30, 2020.

(51) Int. Cl.

*A61H 1/02* (2006.01)
*A41D 13/12* (2006.01)
*D04B 1/10* (2006.01)
*D04B 1/24* (2006.01)

(52) U.S. Cl.

CPC ....... *A61H 1/0274* (2013.01); *A41D 13/1236* (2013.01); *D04B 1/108* (2013.01); *D04B 1/24* (2013.01); *A41D 2400/32* (2013.01); *A41D 2500/10* (2013.01); *A61H 2201/165* (2013.01)

(58) Field of Classification Search

CPC .. A61H 1/0274; A61H 2201/165; D04B 1/24; D04B 1/108; A41D 2400/32; A41D 2500/10

See application file for complete search history.

(56) References Cited

U.S. PATENT DOCUMENTS 6,755,795 B2 6/2004 Marmaropoulos et al.
2003/0204151 A1* 10/2003 Rastegar .............. A61H 31/006 601/44
2008/0103397 A1* 5/2008 Barak .................. A61B 5/0285 600/492
2009/0234265 A1* 9/2009 Reid, Jr. .............. A61H 9/0078 602/76

(Continued)

FOREIGN PATENT DOCUMENTS

WO 2008/022727 A1 2/2008

OTHER PUBLICATIONS

Holsuch, B., et al. "Two-spring model for active compression textiles with integrated NiTi coil actuators." Smart Materials and Structures, IOP Publishing. Feb. 6, 2015.

(Continued)

*Primary Examiner* — Timothy A Stanis
(74) *Attorney, Agent, or Firm* — Merchant & Gould, P.C.

(57) ABSTRACT

Anchoring of fabrics for applications in which force is applied by or on the fabric facilitates new uses and functionalities. Dynamic anchoring through any of three modes (mechanical, compressive, or friction-based) enables transient or permanent anchoring across a garment or other fabric.

10 Claims, 16 Drawing Sheets

(56) References Cited

U.S. PATENT DOCUMENTS

| | | | | |
|---|---|---|---|---|
| 2015/0140886 | A1* | 5/2015 | Kapsali | D03D 15/292 442/353 |
| 2016/0107309 | A1* | 4/2016 | Walsh | A63B 21/0054 248/550 |
| 2016/0186366 | A1* | 6/2016 | Mcmaster | D04B 1/24 28/143 |
| 2016/0213548 | A1* | 7/2016 | John | A61B 5/1107 |
| 2018/0008502 | A1* | 1/2018 | Asbeck | A61H 3/00 |
| 2018/0049903 | A1* | 2/2018 | Witherspoon | A61F 5/37 |
| 2018/0235760 | A1 | 8/2018 | Khair et al. | |
| 2018/0242655 | A1* | 8/2018 | Holschuh | A61H 1/006 |
| 2018/0370020 | A1* | 12/2018 | Murakami | A61H 3/008 |
| 2019/0017199 | A1* | 1/2019 | Granberry | B32B 5/026 |

OTHER PUBLICATIONS

Foo, E., et al. "Design Tradeoffs in the Development of a Wearable Soft Exoskeleton for Upper Limb Mobility Disorders." Proceedings of the 2019 Design of Medical Devices Conference, Wearable Technology Lab, University of Minnesota—Twin Cities. Apr. 15, 2019.

* cited by examiner

FIG. 10A
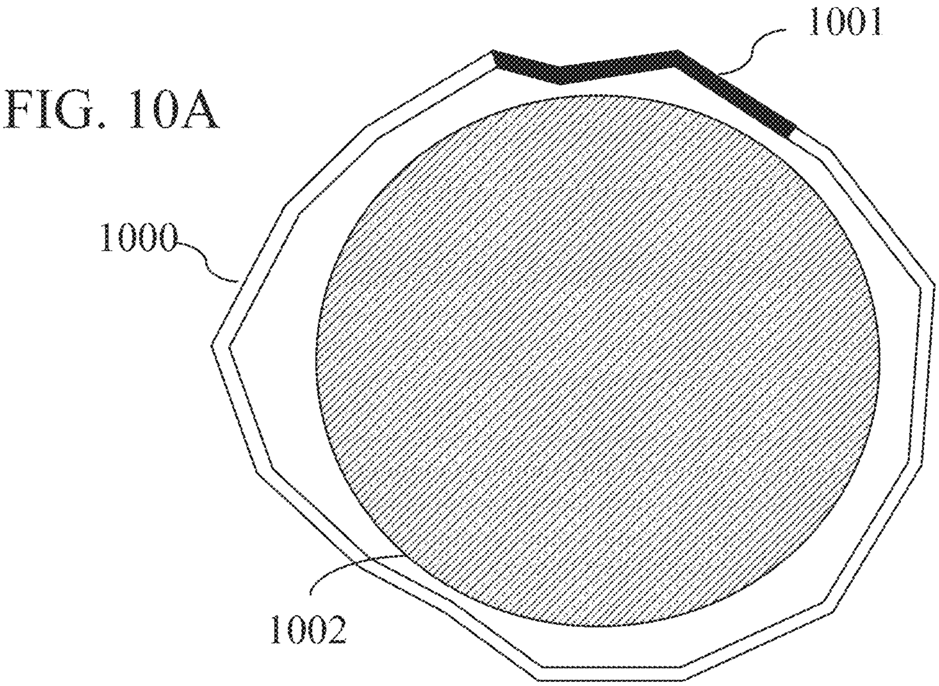
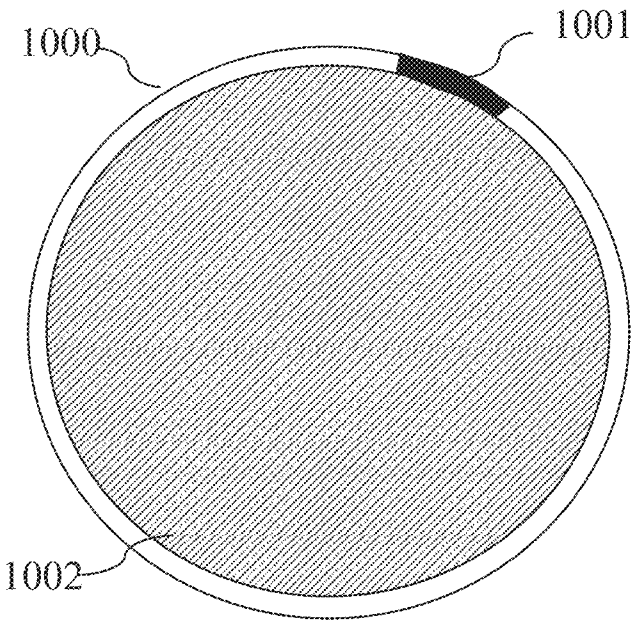
FIG. 10B

DYNAMIC ANCHORING USING LOCALIZED ACTIVE COMPRESSION

CROSS-REFERENCE TO RELATED APPLICATION

The present application claims the benefit of U.S. Provisional Application No. 63/001,895, filed Mar. 30, 2020, the contents of which are hereby incorporated herein by reference in their entirety.

GOVERNMENT INTEREST STATEMENT

This invention was made with government support under IIS-1722738 awarded by the National Science Foundation. The government has certain rights in the invention.

TECHNICAL FIELD

Embodiments relate to wearable devices that can produce compression and enhanced friction or anchoring in desired locations and patterns. In embodiments, different quantities of compressive force, materials and coatings, or knit pattern directionality can contribute to enhanced frictional hold on frustoconical structures like human limbs or torso. Such structures can be used for a variety of applications including promotion or inhibition of circulation, treatment of anxiety-related disorders, and support or structural assistance such as vertical loading.

In particular, embodiments described herein relate to the anchoring of such garments in order to apply desired forces.

BACKGROUND

Anchoring of garments is typically accomplished by fixing a particular portion of a garment to a corresponding anatomical structure such as a bone. For example, slings are anchored by wrapping around the shoulder, and splints are anchored by running alongside straight bones. Robotic systems such as exosuits similarly rely on either direct or indirect contact with fixed points of a wearer's anatomy to provide anchoring for the functions of those garments. Anchoring can be provided by compression at a particular region, such as by tightly contracting a garment or other structure around a fixed point.

Medical compression garments are worn articles of clothing that apply pressure to the body either through garment reduction (e.g., knit elastane shapewear) or through inflation (e.g., a blood pressure cuff). Compression is an effective medical treatment for disorders ranging from varicose veins and lymphedema to orthostatic intolerance and deep vein thrombosis. The pressure profile created by a garment (whether used for a medical or aesthetic purpose) can vary based upon the way in which it is used. The cross-sections of various body parts change depending upon whether the person is seated, standing, or lying down. Therefore an under-sized garment, which typically cannot be resized or reshaped depending on the user's activity level or body position, may apply different levels of compression for users with different levels or types of activity.

Shape memory alloys and other smart materials can be electrically or thermally controlled to induce thermo-mechanical transformation which transforms an unactuated, less-stiff material to an activated, higher-stiffness material. These states are referred to as martensite and austenite, respectively. For example, knitted garments of shape memory material can provide compression in a desired area, just as inflated garments do.

Exosuit technologies remain bulky and limited in their functionality, since they are limited to functions that can operate based on the limited locations of fixed points that the garments can anchor to. With improvements in shape-memory functionality, power storage, and related technologies, exosuits have increasing potential but are still limited to specific modes of function based on these fixed points.

SUMMARY

In order to effectively apply force to move the body using an exoskeleton, actuators are anchored to provide leverage for the desired motion and to couple the limb mass to the actuator. The traditional method of on-body anchoring uses either rigid materials or local, natural anthropometric landmarks as fixture points for soft exoskeletons, but limits the scope of actuation based on available anchor points. As described herein, dynamic garment tightening produces transient anchor points. Specifically, separate, circumferentially-integrated active materials (e.g., shape memory alloys (SMAs)) are designed as constrictive actuators to temporarily tighten strategic regions of the garment to provide friction-based anchoring. Friction can hold a garment in place independent of local anthropometric landmarks, creating a local anchor.

In one embodiment, a fabric for forming a frictional anchoring point is disclosed. The fabric includes a frustoconical section of knitted material extending from a first end to a second end, wherein the cross-sectional area of the frustoconical section at the first end is smaller than the cross-sectional area of the frustoconical section at the second end. A plurality of knitted rows of an active material make up the frustoconical section, and each of the knitted rows defines a corresponding closed ring about the frustoconical section. Each of the corresponding closed rings has a martensite diameter and an austenite diameter based upon the active material and a knit pattern, and each of the knitted rings is arranged along a knit pattern such that a plurality of loop tips of each of the knitted rings is oriented towards the first end.

The fabric can include a high-friction coating. The high-friction coating can be applied to only a portion of the corresponding closed loops, the portion including the tip of each of the corresponding closed loops.

In another embodiment, a system includes a first anchor portion coupled to a first underlying structure, a second anchor portion coupled to a second underlying structure; and a coupler arranged between the first anchor portion and the second anchor portion.

Either of the first anchor portion and the second anchor portion can be selected from a mechanically-based anchors, compression-based anchors, and friction-based anchors.

At least one of the first anchor portion and the second anchor portion can be a friction-based anchor that includes a frustoconical section of knitted material extending from a first end to a second end. The first end can have a cross-sectional area and a second end can have a second cross-sectional area, wherein the cross-sectional area of the first end is smaller than the cross-sectional area of second end. A plurality of knitted rows of an active material can make up the frustoconical section, with each of the knitted rows defining a corresponding closed ring about the frustoconical section. Each of the corresponding closed rings can have a martensite diameter and an austenite diameter based upon the active material and a knit pattern. Each of the knitted rings can be arranged along a knit pattern such that a plurality of loop tips of each of the knitted rings is oriented towards the first end.

Each of the loops of the friction-based anchor can include a high-friction coating. The high-friction coating can be applied to only a portion of the corresponding closed loops, the portion including the tip of each of the corresponding closed loops. The coupler can be an actuatable strap. The actuatable strap can include a shape memory material to facilitate actuation.

The first underlying structure and the second underlying structure can each be a portion of a body, and the first anchor portion and the second anchor portion can each form a part of a garment. Alternatively, the first underlying structure and the second underlying structure can each comprise a portion of a body, while the first anchor portion forms a part of a first garment; and the second anchor portion forms another part of a second garment. At least one of the first anchor portion and the second anchor portion can be a dynamically actuatable anchor. Alternatively, the dynamically actuatable anchor can be actuated on demand by a user to temporarily tighten strategic regions of a garment. In embodiments, the dynamically actuatable anchor can be automatically actuated to temporarily tighten strategic regions of a garment. In one embodiment, the garment is an exosuit, while in another it is a physical therapy garment.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIGS. 10A and 10B depict a tourniquetting device according to an embodiment.

Figure 1A:
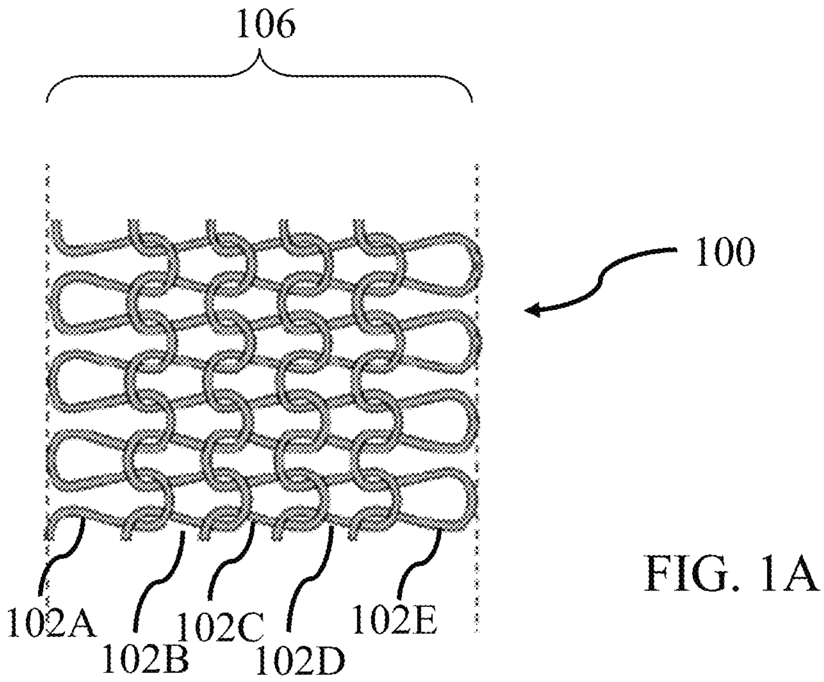
FIGS. 1A and 1B are plan views of the active fabric for a therapeutic compression garment with weft knit active yarns in relaxed and contracted states, respectively, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The following disclosure describes several different garments, materials, and knitting patterns that can be used to produce therapeutic garments and aesthetically improved garments. Garments like those described with respect to the disclosed embodiments provide the desired therapeutic benefits of assistance with particular movements, or prevention of undesirable movements, through dynamic anchoring. Some embodiments described herein additionally provide deployable features that provide more force while still, in the un-deployed position, not being cumbersome to wear.

Use of functional fabrics and fibers to form fabrics, garments, and materials is described in Applicant's own prior work, PCT/US2018/063066 (published as WO 2019/108794 on Jun. 6, 2019), the contents of which are incorporated by reference herein in their entirety. In addition to new and useful fabrics, garments, and materials described in that material, the instant application describes improvements in the implementation of some such systems through the use of dynamic anchoring. Specifically, while fabrics described in WO 2019/108794 provide unique combinations of force and displacement, in some embodiments described herein it is helpful to consider the use of what are referred to throughout this application as anchor points: locations where the active materials are mechanically fixed to a corresponding structure by appropriate use of shape, compression, or frictional coupling.

Functional Fabrics and Fibers

Garments described herein are based on interconnected loops (knits) or wound strands (springs) of shape memory alloy material, which can transition between a loose, flexible martensite state and an active, rigid austenite state. In one embodiment, when loops of these material are knitted together they form a functional fabric that contracts upon activation. Other embodiments described herein include specific improved yarns or filaments with desired properties.

Functional fabrics of all types described herein can provide actuation, sensing, energy harvesting, and communication as intrinsic fabric properties by integrating multifunctional fibers into designed textile geometries. The fiber material and the textile architecture can be designed to achieve functional fabric characteristics such as distributed actuation and sensing, variable stiffness, and complex, three-dimensional deformations. Through geometric design on the macroscopic and mesoscopic scales, knitted functional fabrics can achieve complex actuation deformations, such as corrugation, scrolling, and contraction. Additional, microscopic design parameters can be selected by the choice of multifunctional fiber and its specific material properties. Specific patterns and materials can be used to generate desired compression for either therapeutic, aesthetic, or other functional purposes such as the elimination of traditional fasteners that are required for non-compressive fabrics.

Anchor Points

In some garments, it is desirable to provide assistance with a particular movement or to confine movement to a particular direction or range. In physical therapy, for example, a desired level of assistance can be prescribed for a particular movement, or alternatively a movement that would be unhealthy or injurious can be prevented. As described in more detail below, assistance or prevention of particular movements can be produced by the use of active fibers or yarns that extend between two parts of the body. As used throughout this specification, yarns, fibers, threads, and filaments interchangeably refer to various constructs of active material that could be used to provide this desired effect.

Such yarns, fibers, threads, and filaments can be attached both to the portion of the garment that is to be moved (or stopped) as well as an "anchor point." As used throughout this disclosure, the term "anchor point" can refer to a body part that provides a stable, relatively immobile anchoring function, as described above.

In some instances, this anchoring point can be a mechanical anchor that is based primarily on shape. For example, in a wearable garment a bony or cartilaginous structure, such as an elbow or an ankle, provides a shape that can be used as an anchor. Typically, shapes that provide suitable structure for use as an anchor point will have a sharp corner or curvature. In addition to such shapes, a suitable shape-based anchor such as these bony structures will have sufficient mechanical strength to resist deformation under typical loads experienced during wearing. In such embodiments, a loop of fabric or other material can be looped around the anchor point, and movement is prevented (such as by a stirrup). Such anchor points are relatively stable and fixed by the anatomy of each person.

Alternatively, anchor points can be 'created,' by increasing compression on a particular portion of the wearer's anatomy. In a second type of anchor, a garment that is normally movable across the wearer's body becomes fixed to the wearer when sufficient compressive force is applied. This phenomenon is related to the general rule that frictional resistance force between two surfaces is proportional to the normal force pressing them together, and by increasing the compression on a portion of a garment, that normal force is increased. In a simple example, a garment stretched around a portion of a body with a circular cross-section will be much more difficult to move longitudinally along the body if the cross-section of the garment is decreased (thus increasing normal force along the circumference). In fact, there may be no sliding between the garment and the wearer whatsoever, if the normal force increases to such an extent that the frictional relationship is static rather than kinetic.

A third type of anchor structure can be used to prevent movement in a particular direction by increasing frictional resistance in a desired direction.

As used throughout this disclosure, "anchor structure" or "anchor point" are terms used to refer to all three of these types of anchors: those formed by natural anchors on the body (such as skeletal structure), those corresponding to areas with enhanced compression due to garment compression, and those corresponding to areas with enhanced frictional resistance to prevent sliding or resist buckling under forces applied in-plane with the knitted material.

In order to effectively apply force to move the body using an exoskeleton, exosuit, or other externally mounted structures on a garment, actuators must be anchored to provide leverage. This leverage can be required to, for example, assist with movement of a limb. In that embodiment, an anchor point is needed to provide leverage for the desired motion and to couple the limb mass to an actuator. The traditional method of on-body anchoring utilizes either rigid materials (e.g., the structure associated with a hard exoskeleton that is attached to the body) or local, natural anthropometric landmarks as fixture points for soft exoskeletons (e.g., a belt that wraps around the waist of a user can anchor and support lower-body systems on the protrusion of the pelvis), but limits the scope of actuation based on available anchor points.

In order to effectively apply force to move the body, actuators must be anchored to provide leverage for the desired motion and to couple the limb mass to the actuator. The traditional method of on-body anchoring utilizes local, natural anthropometric landmarks as fixture points (e.g., a belt that wraps around the waist of a user can anchor and support lower-body systems on the protrusion of the pelvis), but limits the scope of actuation based on available anchor points.

As described herein, dynamic garment tightening can be used to produce transient anchor points, which can themselves be changed as desired by constricting different portions of the garment. Specifically, circumferentially-integrated active materials (e.g., shape memory alloys (SMAs)) can be designed as constrictive actuators to temporarily tighten strategic regions of the garment to provide friction-based anchoring. Friction can hold a garment in place independent of local anthropometric landmarks, creating a local anchor. SMA-based compression garments have been shown to produce controllable pressures up to 225 mmHg, and production of even higher levels of compression could be generated using leverage and creative designs. The same SMA actuators used for bulk therapeutic compression can therefore instead be tailored to enable local dynamic anchoring.

Compression-Based Anchors

Throughout this disclosure, several specialized terms related to active knitted fabrics are used to describe the types of compression that can generate anchor points by increasing compression. Compression is a function of "knit index," which is the ratio of the area of a loop of active material enclosed in the martensite state and the square of the active knit material wire diameter. Depending on the knit index among other factors, a functional fabric with desired properties can be created. Two particularly important properties are the pressure applied by the fabric (i.e., how forcefully a garment made of the active fabric squeezes when the active material is actuated) and the actuation contraction of the fabric (i.e., the normalized difference of the unactuated and actuated fabric lengths). Actuation contraction of an active knit fabric is a function of the martensite length $l_M$ and the austenite length $l_A$:

$$\zeta=(l_M-l_A)/l_M,$$

Materials are described herein that can be used to generate active fabrics, threads, filaments, or yarns, including materials that include active components in specific locations. Filaments are described herein that include multiple heterogeneous portions, at least some of which are made of active materials. Active materials are those that have some active or functional properties, such as actuatable mechanical components (e.g., piezoelectrics, electro-mechanical components, thermo-mechanical components, and shape memory materials), electrically functional components (e.g., conductive, semiconductive, or photoelectric materials), or actuatable thermal components (e.g., materials that undergo exothermic or endothermic reactions upon exposure to stimulus, or electrically resistive materials that produce heat upon exposure to an electrical potential).

In embodiments the filament can be incorporated into a yarn, which is a combination of filaments. Alternatively, in embodiments the filament can be incorporated into a thread, which comprises multiple yarns bound in a braid pattern. Each of the filaments that make up a yarn or a thread can be a functional filament, or in embodiments functional threads can be interspersed among non-functional filaments.

Figure 1B:
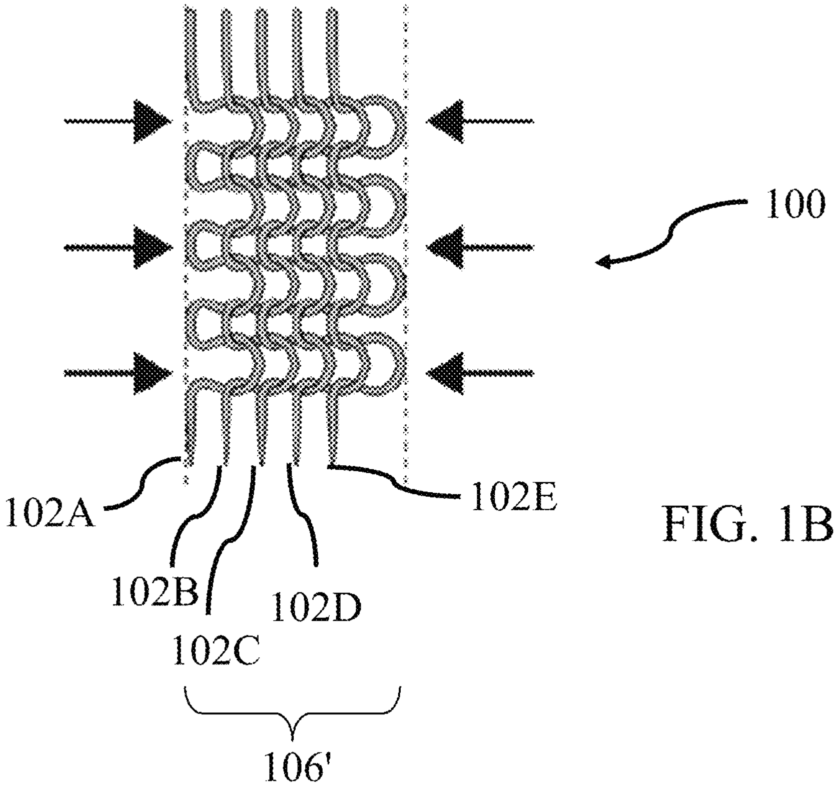

FIGS. 1A and 1B are plan views of fabric 100 made of a series of rows of weft knit active yarns in relaxed and contracted states, respectively, according to an embodiment. Fabric 100 includes five rows (102A, 102B, 102C, 102D, 102E) of an active yarn material. The term "active yarn material," as described above, can refer to any thread, strand, filament, braid, or bundle of materials that responds to thermal or electrical stimulation to change from a relaxed state to an activated state. In embodiments, braided or coaxial bundles can provide a relatively higher level of strength than individual filaments and can also provide more force when switching between relaxed and activated states.

The active yarn material that makes up each of the rows 102A, 102B, 102C, 102D, 102E can comprise a shape memory alloy (SMA). In embodiments, the SMA can be a type of active metal with shape memory properties that is highly malleable in a cool, martensite phase and has shape recovery abilities, even under load, during the elastic austenite phase. In one embodiment, the active yarn material can be a nitinol material. SMAs can be engineered to switch from martensite to austenite depending on whether they are above or below a material-specific transition temperature.

SMAs can be engineered to exhibit desired properties by altering the material composition and the heat treatments. Specifically, stress, strain, recovery, and activation temperature are functional properties that can be manipulated through the thermomechanical manufacturing process. Consequently, SMAs can be designed to activate at specific temperatures to require relatively low power consumption and temperature loads on the body compared to powered, pneumatic systems. In addition to the SMAs as described above, in alternative embodiments other types of materials such as SMA spring-based architectures can be used.

Knit structures such as fabric 100 can be used in large, complex structures that are actuated across complex surfaces (such as the surface of the body). The variety of structures that can be created with interlocking loops or stitches within each row (e.g., rows 102A, 102B, 102C, 102D, 102E) and the shape change that occurs when these loops are subject to tension can be customized to the contours of a particular body part such as a leg or arm.

Knitting can be divided into two general architectures: (1) weft knitting, which is a process in which an individual end of yarn is fed into or knit by one or more needles in a crosswise (lateral) fashion, and (2) warp knitting, which is a process in which a multiplicity of yarns are fed into or knit by one or more needles in a lengthwise (vertical) fashion. While weft knits have more mechanical stretch, warp knits are often more stable architectures and can be constructed using many wales, or columns, of yarn. Additional yarns can be introduced into weft knit structure by utilizing a jacquard system, which selectively engages and disengages needle beds to form a knit pattern using multiple yarns. Warp knits can also achieve complex patterning through the use of guide bars, which allow some warp knit structures (e.g., raschel knits) to appear like lace-structures. Hand-knitting (a weft knit structure), lace-making, crocheting, tadding, and needle-lace are other manual methods of selectively looping yarns into a fabric structure. Complex patterns can be achieved using other techniques such as hand-knitting, lace-making techniques, or others, which can be used to loop yarns selectively into the fabric structure. Although FIGS. 1A and 1B depict a simple weft pattern, other embodiments can include a variety of relatively more complex knitting stitches and patterns including warp knitting, jacquard, intarsia, Fair Isle, or any other knitting pattern and combinations thereof.

FIG. 1B shows the same five rows 102A, 102B, 102C, 102D, 102E of active material described above with respect to FIG. 1A, but in FIG. 1B the rows 102A, 102B, 102C, 102D, 102E are in a compressed state indicated by arrows. Fabric 400 can change from the relaxed state shown in FIG. 1A to the compressed state shown in FIG. 1B due to a change in temperature. For example, the active material can have a transition temperature, and once each of the rows 102A, 102B, 102C, 102D, 102E becomes hotter than that transition temperature the active material can transition from martensite to austenite, and vice versa.

As shown in FIGS. 1A and 1B, depending upon the state of the rows of an active material, the overall width of the fabric can vary. Width of an active fabric can be relatively wider in the relaxed state, and relatively narrower in the activated state. A user can change between these two states by heating or cooling the rows. To heat the rows, electrical current can be routed through some or all of the rows. Alternatively, an adjacent liner can provide heat or cooling to fabric to cause it to change between activated and relaxed states.

A fabric made of a shape memory alloy or other active knit material can be modified to form other fabric types or patterns by changing any of at least five features. First, the relative number of active yarns to passive yarns can be varied to provide different levels and targeted areas of compression. Second, the stitch size or relative density (i.e., gauge) of the stitches can be modified to affect the knit index $i_k$. Third, current and voltage (or power dissipation) through the active yarns can be controlled to affect activation of each of the active yarns. Fourth, the weight or diameter of the yarn (which can be either a single filament or a bundle of active filaments) can be modified, with thicker yarns generally providing a higher level of compression upon activation. Finally, the transition temperature of the active yarns can vary between embodiments, and in fact within segments of the same fabric, to create zones as described in more detail below. Zones that have different transition temperatures will activate at different times, even under uniform heating or cooling.

Figure 2A:
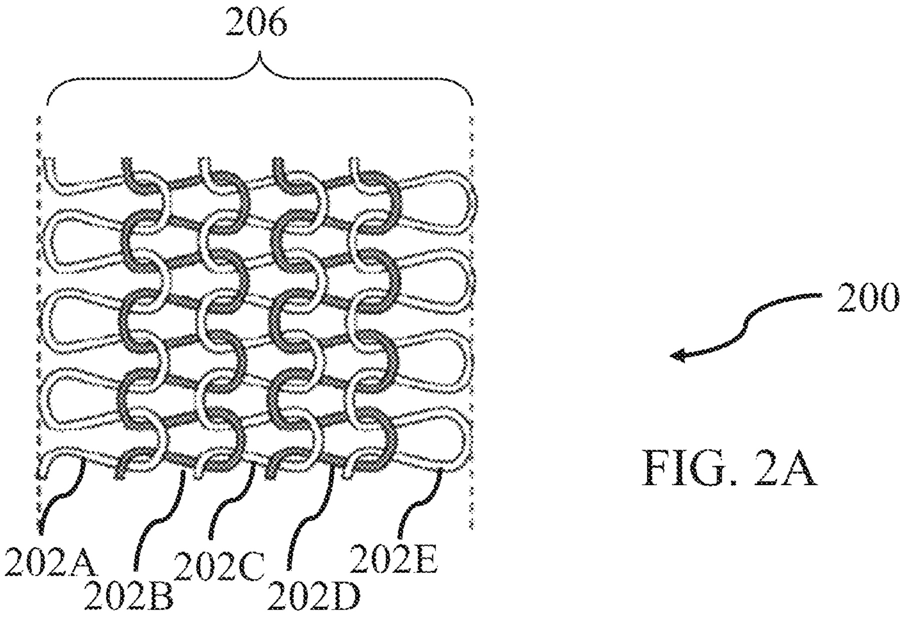
FIGS. 2A and 2B are plan views of an active fabric for a therapeutic garment with weft knit active yarns in relaxed and contracted states, respectively, according to an embodiment.
Figure 2B:
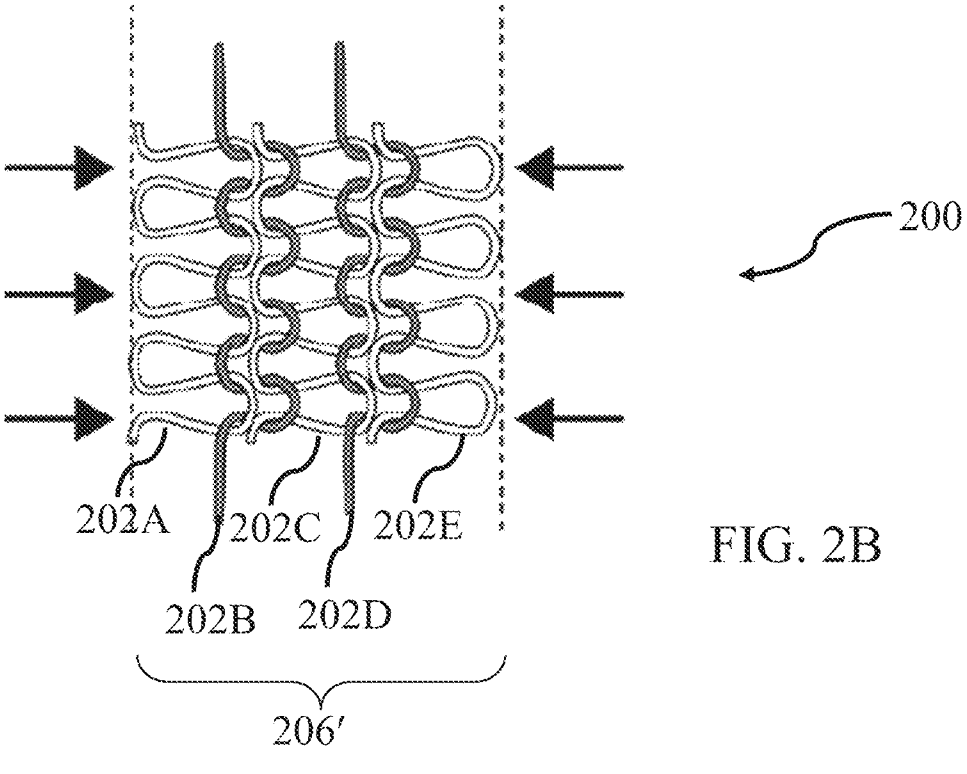

FIGS. 2A and 2B are plan views of fabric 200. Fabric 200, like fabric 100 of FIGS. 1A and 1, includes five rows (202A, 202B, 202C, 202D, 202E) of knitted material. Fabric 200, unlike fabric 100, includes multiple knitted materials in alternating rows. Shaded rows 202B and 202D are an active yarn material, similar to the material that makes up active rows 102A-102E described above with respect to FIGS. 1A and 1B. In contrast, rows 202A, 202C, and 202E are made of a passive material that does not transition between martensite and austenite states. A passive material can be non-conductive such that electrical heating will not occur in a passive material. For example, the passive material could be a non-conductive polymer. A non-conductive polymer will not draw power when a voltage source is attached to it, therefore use of passive zones in a fabric (e.g., fabric 200) can reduce overall power dissipation per unit area.

Consequently, while in the relaxed state fabric 100 of FIG. 1A looks substantially the same as fabric 200 of FIG. 2A. In contrast, in the activated state fabric 100 (shown in FIG. 1B) compresses by a greater amount than fabric 200 (shown in FIG. 2B, compression indicated by arrows). That is, the proportional difference between width 106 and width 106' is larger than the difference between width 206 and width 206'.

It should be understood that, for convenience of representation, the knit patterns of FIGS. 1A, 1B, 2A, and 2B are shown as flat, nearly two-dimensional representations, but they could be wrapped around a body part (such as a limb) with the left edge connected to the right edge to form a cylinder. The types of activation described above would then cause a decrease in the circumference of the cylinder, which in turn creates the type of increase in normal force between the garment and the wearer that can provide an anchoring point.

Figure 3A:
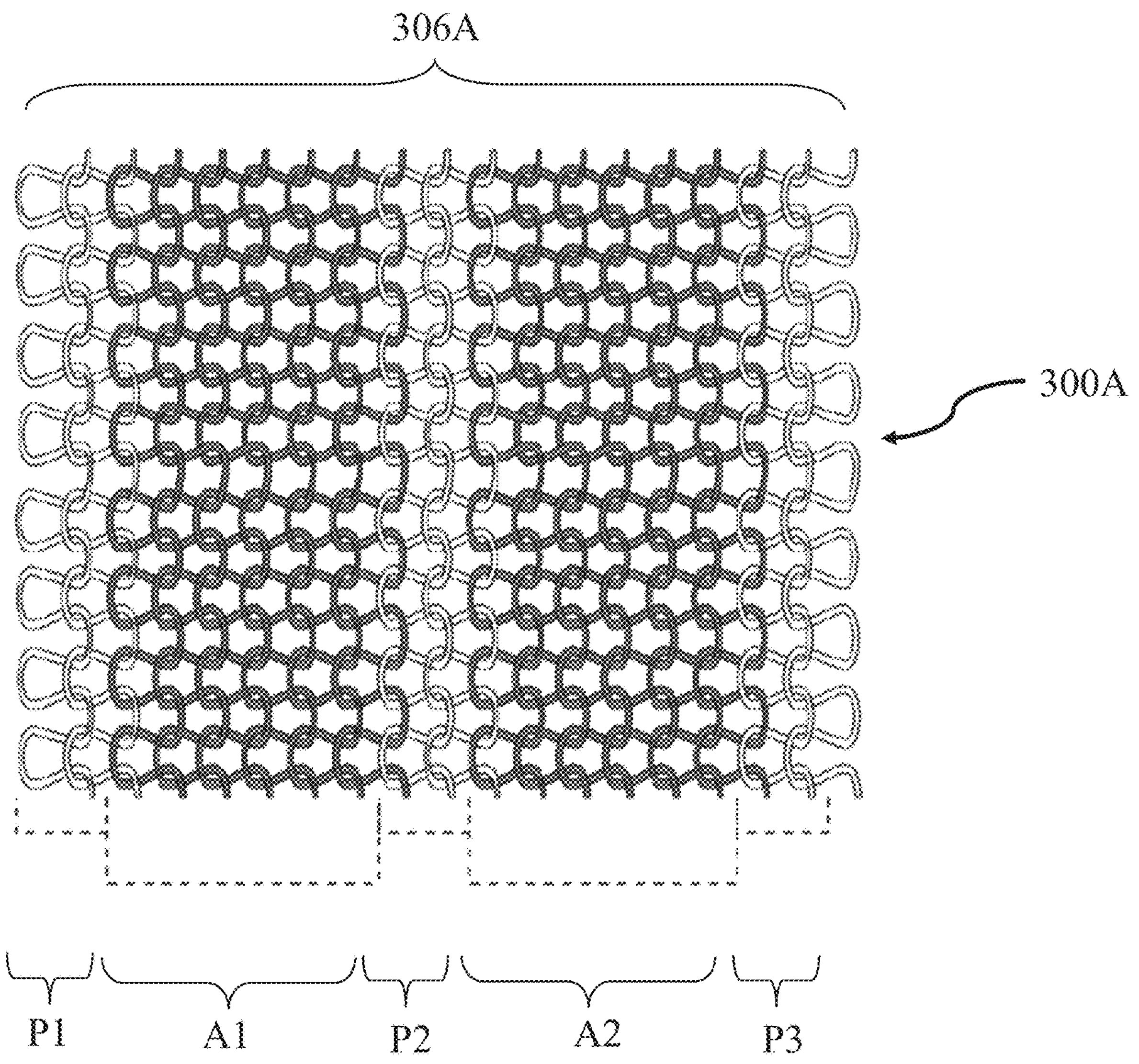
FIGS. 3A-3C are plan views of three different fabrics having varying levels of active material, according to three embodiments.
Figure 3B:
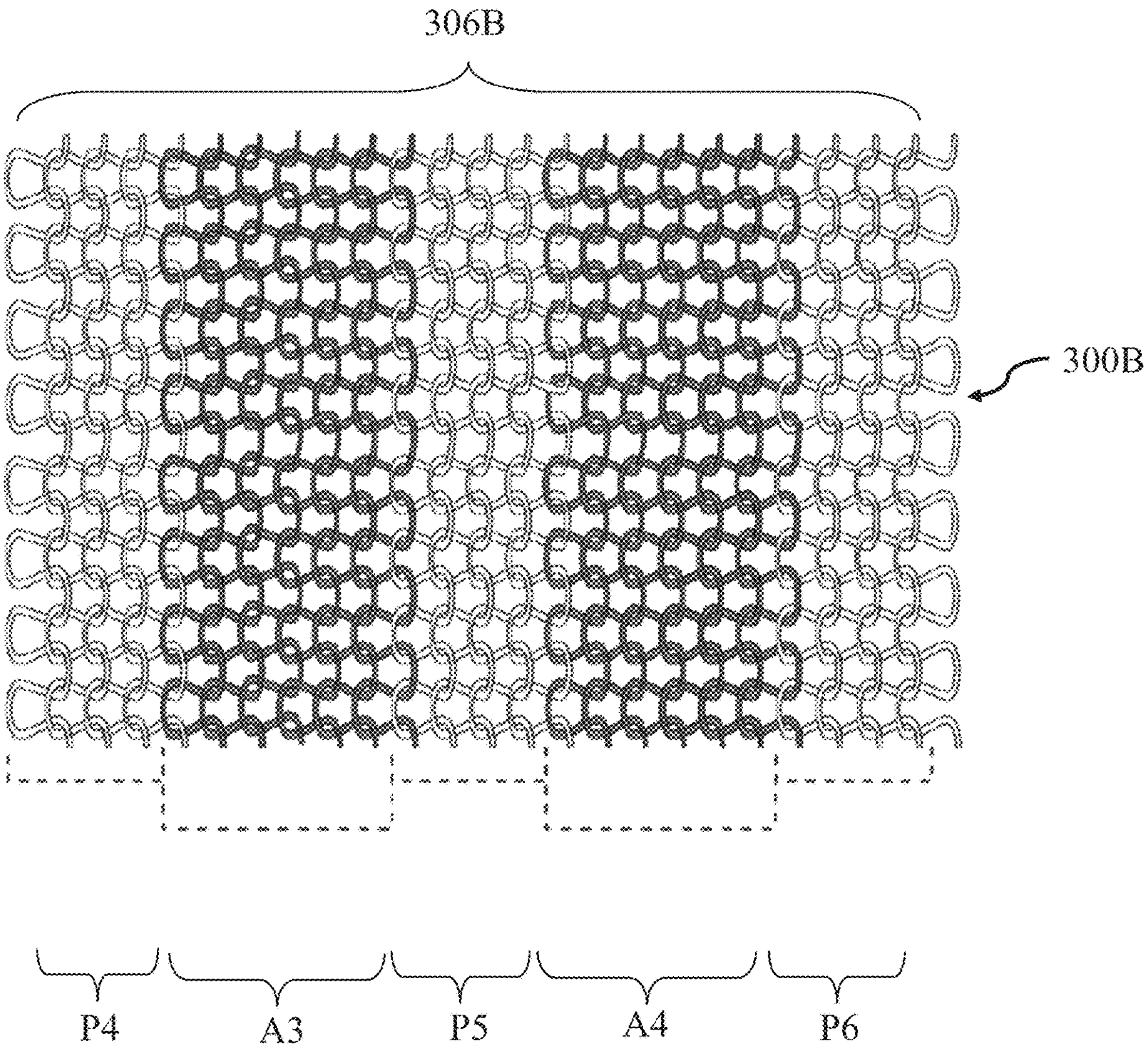
Figure 3C:
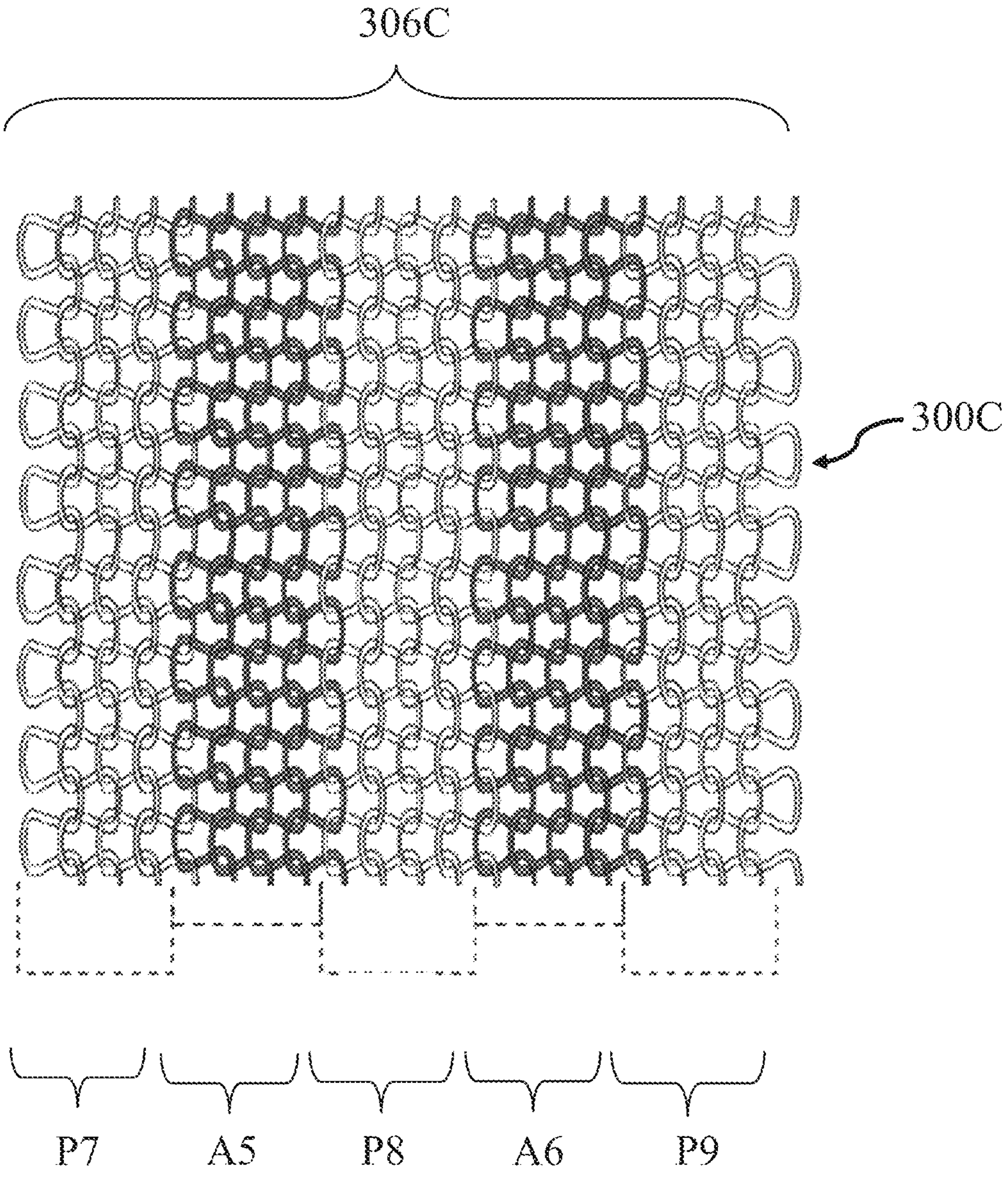

FIGS. 3A, 3B, and 3C are plan views of three weft knitting patterns including active and passive sections. The same general principles of contraction to cause compression described above with respect to FIGS. 1A, 1B, 2A, and 2B apply to the embodiments shown in FIGS. 3A-3C.

As shown in FIG. 3A, fabric 300A includes two active sections A1 and A2, as well as three passive sections P1, P2, and P3. Active sections A1 and A2 are each made up of six rows of active knitted material, described above with respect to FIGS. 1A, 1B, 2A, and 2B. Fabric 300A is shown in the relaxed state. By applying heat to active section A1 and/or active section A2, the width 306A of fabric 300A can be reduced.

The maximum possible extent of the reduction in width varies based upon the number of rows of knitted material within each active section (A1, A2) and the number of rows within each passive section (P1, P2, P3), in addition to the factors described above ($i_k$ and d) that affect actuation contraction. Likewise, the maximum possible pressure depends on the applied force $F_{app}$ as described above. For a therapeutic compression garment, the applied force is often relatively high while the total actuation contraction is low, which can be facilitated by the use of passive sections P1-P3 interspersed with active sections A1 and A2 that provide strong contraction over a short distance.

In the embodiment shown in FIG. 3A, each active section A1, A2 includes six rows, whereas each passive section P1, P2, P3 includes two rows of passive material. Therefore 75% of the rows within fabric 300A can be activated to cause compression. In alternative embodiments such as those shown in FIGS. 3B and 3C, where different portions of the fabric are active or passive, the length can remain constant in passive regions while varying due to activation of the active regions as described in the equations above.

Active sections A1 and A2 can be activated independently of one another. For example, in embodiments fabric 300A can be activated by applying an electrical current through active sections A1 and A2 to cause heating. In some cases it may be desirable to activate less than the full 75% of the rows. For example, if it is desirable to activate only 37.5% of the rows, either active section A1 or active section A2 could be activated, leaving the other in the passive state.

FIG. 3B is an alternative embodiment in which fabric 300B includes active sections A3 and A4, as well as passive sections P4, P5, and P6. Like fabric 300A, fabric 300B includes active sections A3 and A4 that each include six rows of an active or shape-memory material. Fabric 300B has relatively wider passive sections P4, P5, and P6 than the counterpart passive sections P1, P2, and P3 of FIG. 3A. In particular, passive sections P4, P5, and P6 each have four rows, in contrast to the 2-row passive sections P1, P2, and P3 of FIG. 8A. The percentage of rows that are active in fabric 300B of FIG. 3B is therefore 60%, compared to 75% that are active in fabric 300A of FIG. 3A.

FIG. 3C is an alternative embodiment in which fabric 300C includes active sections A5 and A6, as well as passive sections P7, P8, and P9. Active sections A5 and A6 each include four rows of an active or shape-memory material, while passive sections P7, P8, and P9 each include four rows of a passive material. The percentage of rows that are active in fabric 300C of FIG. 3C is therefore 50%, compared to 75% that are active in fabric 300A of FIG. 3A or 60% in fabric 300B of FIG. 3B.

Thus, one way of modifying the total displacement during contraction of a compression garment is to modify the portion of the knit pattern that is made up of active material. In general, a higher percentage of active material causes proportionally greater levels of displacement at activation, whereas a lower percentage of active material reduces power consumption.

In addition to the portion of the fabric that is active, another mechanism for changing the compression of the garment is to change the characteristics of the active material itself. Different materials can be used that will exhibit relatively greater or lesser quantities of displacement. Additionally or alternatively, different materials can be used that will exhibit relatively greater or lesser quantities of compressive force.

Figure 4:
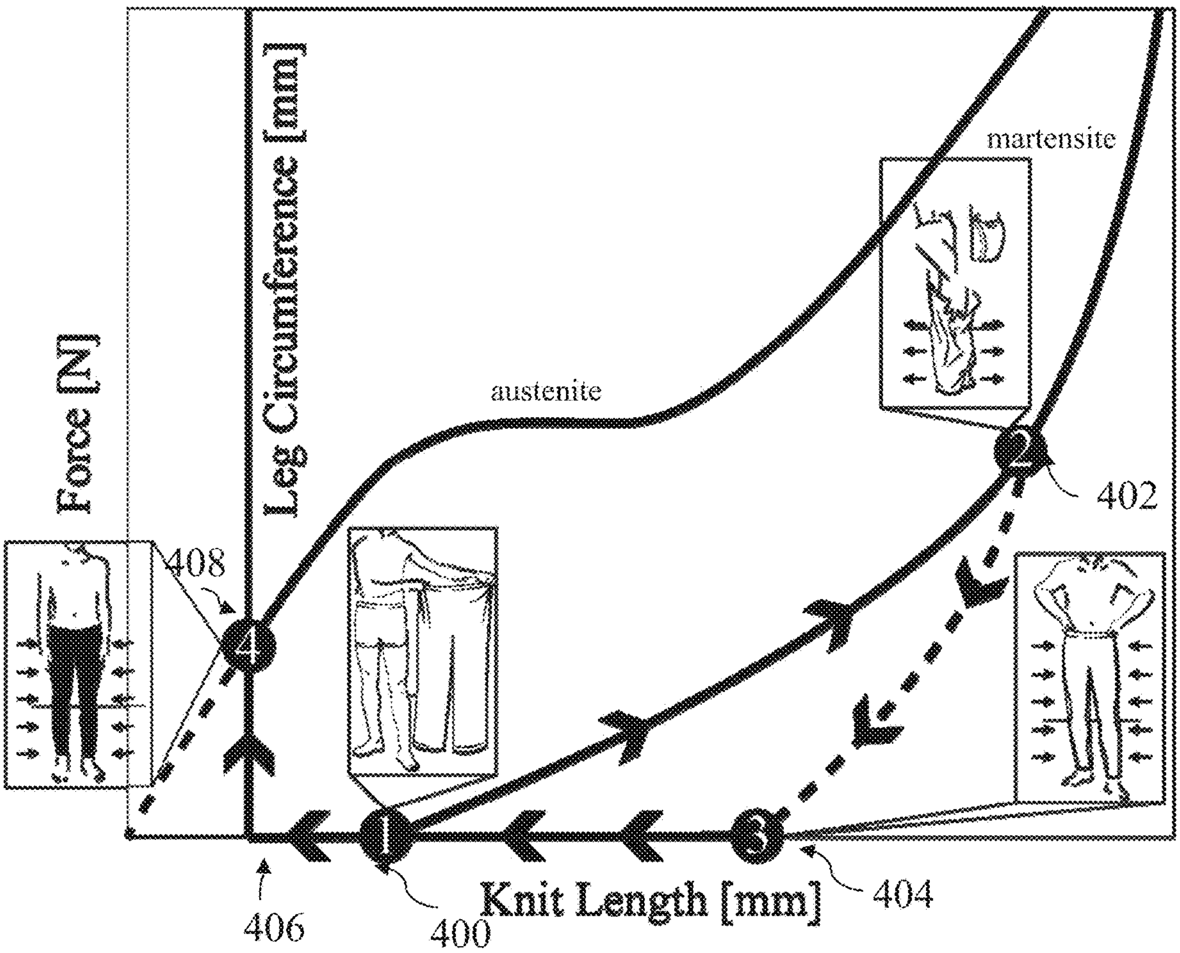
FIG. 4 is a force-length diagram for a self-fitting active shape memory garment according to an embodiment.

FIG. 4 depicts the change in length and force for a self-fitting, compressive garment. In general, as described above, self-fitting garments aim to provide more displacement and less force, to provide a garment that begins with substantial "ease" and shrinks to little or no "ease" (i.e., little or no difference in circumference of the garment compared to the circumference of the body part it covers). This is different from a compression garment which must begin stretched, or fitted to the body initially to translate maximum compressive forces to the body.

Two garments having identical knit indices can achieve different compressive forces on the body depending upon the austenite and martensite curves. The force applied by the fabric will be based upon the contraction of the circumference of the garment, which is in turn dependent upon the knit index of the material and upon the wire diameter. The force applied is also dependent upon the leg circumference in FIG. 4 (or, in other embodiments, upon the circumference of any other loop of fabric). Knit index generally correlates to a level of contraction, while wire diameter correlates to a level of force.

At 400, an oversized, martensite garment is provided. As the garment is donned at 402, some force is applied to stretch the garment. Once donned, the martensite garment relaxes on the body, such that no force is applied as shown at 404. As the garment is heated it transitions to austenite, causing contraction of the fabric. At first, this contraction does not cause any force to be applied, until the garment reaches the same circumference as the body part it covers at 406. Thereafter, the garment may continue to apply some force as shown at 408.

The force shown on the azimuth of FIG. 4 affects the suitability of a garment for use in forming an anchoring point. Specifically, with increasing force, as described above, the garment will provide increasing levels of kinetic friction and, ultimately, static friction.

Mechanically-Based Anchors

As described above, the simplest type of mechanically-based anchor (or shape-based anchor) uses a stable structure, such as a boney or cartilaginous protrusion in the garment context. A fabric can be shaped using appropriate knit pattern or stitching to mechanically fit to the protrusion in order to anchor the rest of the material to that fixed point or shape. Outside the garment context, this type of mechanically-based anchor could use a flange, a 900 turn in a pipe, or some other similar protuberance having sufficient rigidity and strength to be used for application of force throughout the remainder of the material.

Figure 5A:
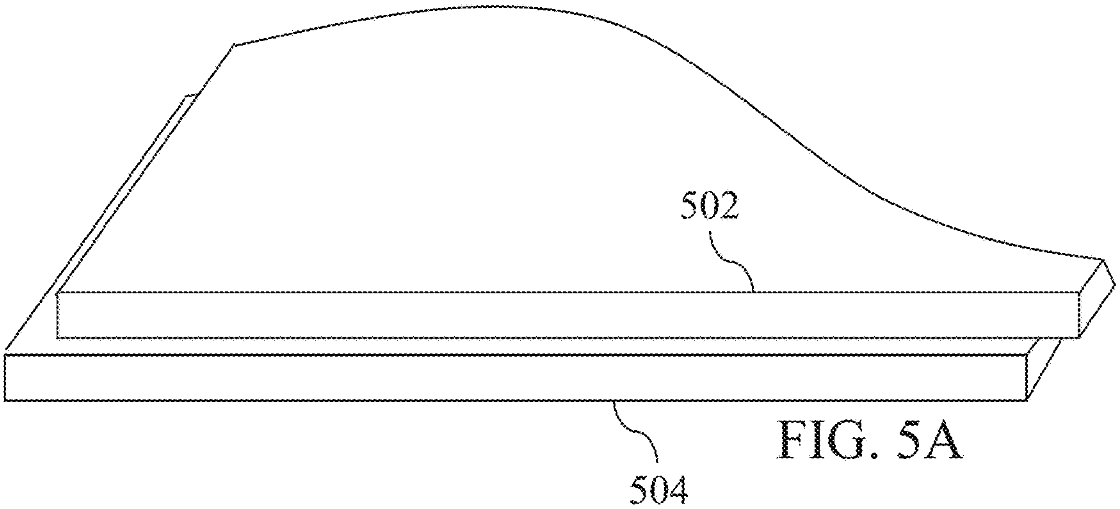
FIGS. 5A and 5B depict a multi-layer fabric with a locking section according to an embodiment with a friction-enhancing geometry.
Figure 5B:
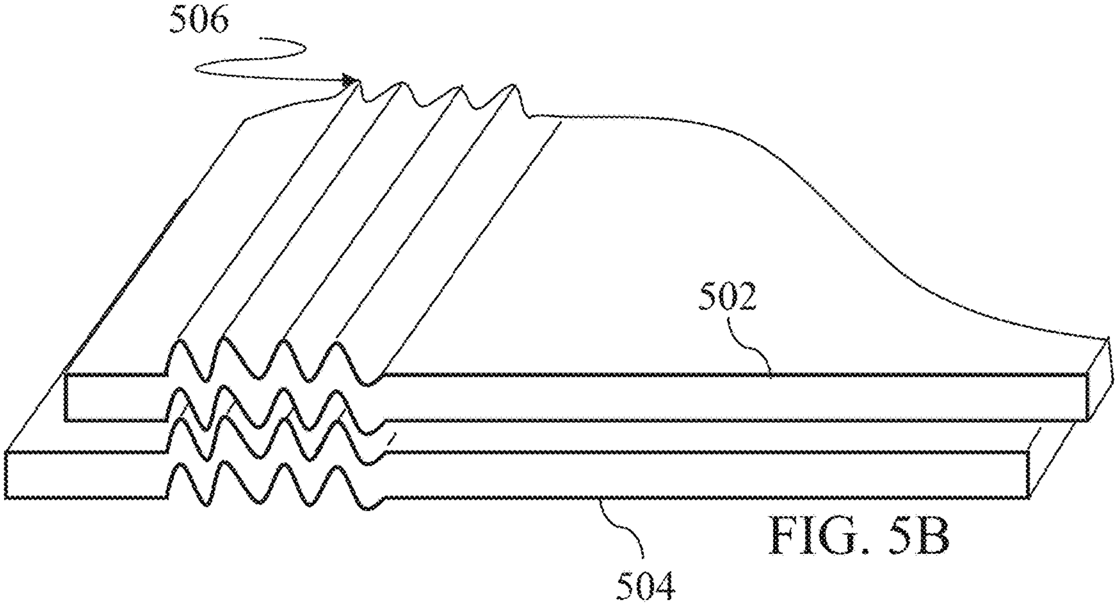

Anchoring can also be caused between multiple layers of active material by changes in the shape(s) of the garment. In FIG. 5A, a first layer of fabric 502 and a second layer of fabric 504 are shown in a partial perspective view. The two layers 502 and 504 are free to slide with respect to one another as shown in FIG. 5A. In contrast, FIG. 5B shows an activated state in which the two layers are buckled, with matching features that interlock with one another at a locking section 506. As such, in the active state, relative movement between the two layers 502 and 504 is prevented in a direction perpendicular to the layers 502 and 504 due to the interlocking ridges at locking section 506. In embodiments, multiple locking sections 506 could be distributed throughout a fabric to prevent movement in multiple directions. For example, a second locking section (not shown) could be added at a portion of the layers 502 and 504 that includes ridges running perpendicular to those of locking section 506. In this way, movement is prevented both left-to-right and front-to-back (referring to the orientation of the layers as shown in FIGS. 5A and 5B). For fabrics or layers having more complex geometries, multiple locking sections (e.g., 506) can be arranged to anchor one layer to another for application of force along any of a variety of directions, such as around a tube for a variable constriction pump.

There are a multitude of interlocking structures that can be formed by the activation of different portions of the fabric. The embodiment described with respect to FIGS. 5A and 5B is perhaps the simplest to construct, as the interlocking structures shown in FIG. 5B can be created merely be alternating between knit and perl rows of the active fabric. Various other structures are contemplated that could, for example, engage or act as a latch, a hasp, or a capo structure. The knit patterns to form such structures can include various combinations of knit and perl loops, as described in FIGS. 4-14 of US 2018/0235760, the contents of which are incorporated herein by reference in their entirety.

Friction-Based Anchors

In some cases, and in particular for garments, it can be beneficial to prevent movement of fabric across the structures (e.g., body parts) that the material is intended to cover. In general, wearers of garments will find movement of those garments to be annoying or uncomfortable, but in some embodiments described above with particular uses inadequate anchoring can cause loss of functionality. If a physical therapy garment is not properly anchored, for example, the assistive or support forces provided by the garment could be improperly directed or ineffective. Likewise in an exosuit, the assistive force provided by the garment should be directed in the right way to accomplish an intended result.

To provide suitable anchoring, it may be desirable to arrange anchors at positions where there are not any suitable protuberances for using mechanically-based anchoring. Likewise, the application of sufficient compressive force to provide compression-based anchoring may be either unfeasible or uncomfortable for the wearer. In these contexts, friction-based anchors may be a preferred solution.

One scenario in which friction-based anchors are particularly useful is where the underlying structure is substantially frustoconical. For example, a typical forearm, calf, or torso is not entirely cylindrical, but rather the cross-section of those structures changes monotonically along the body. As will be understood from the description above, this makes mechanically-based anchoring inapplicable. Likewise compression-based anchoring may be suitable to withstand forces that would pull the fabric from narrower to thicker portions, but would be ineffective (or even counterproductive) at resisting forces pulling in the opposite direction, from thicker to narrower.

Figure 6A:
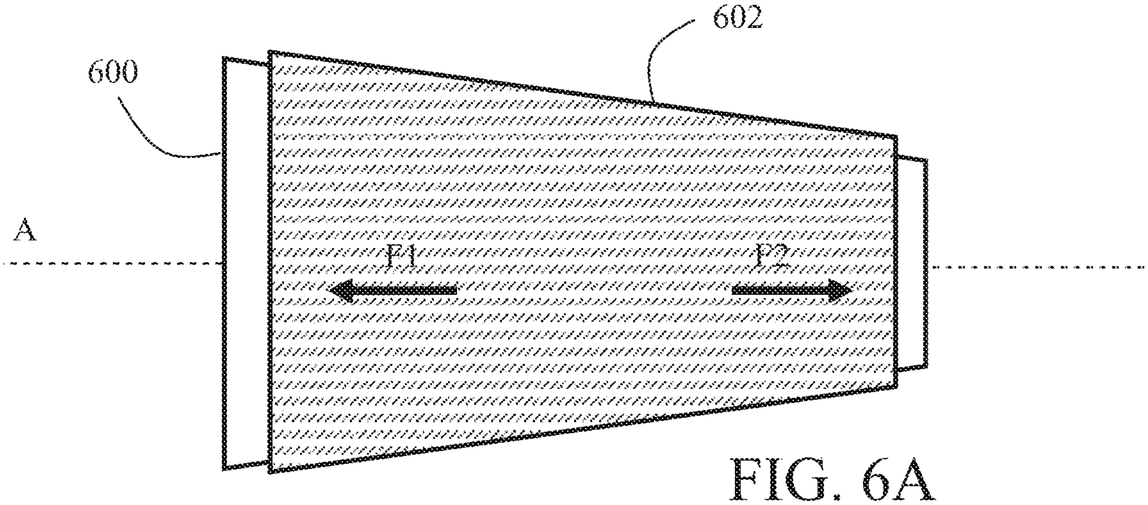
FIGS. 6A-6G depict a friction-based anchoring system and components usable therein, according to an embodiment.

FIG. 6A shows a simplified example of a structure 600 and fabric 602 that surrounds that structure 600 in a closed sleeve shape. Structure 600 and fabric 602 could be, say, a leg and portion of a pair of pants, respectively. Alternatively, structure 600 could be a tapered cup while fabric 602 could be a zarf. Alternatively, structure 600 could be a portion of a torso and fabric 602 could be a weightlifting belt or exosuit. Various other embodiments will be readily apparent to a person of ordinary skill in the art, in which a good anchor or fit is desired between a frustoconical structure 600 and corresponding covering fabric 602.

If the fabric 602 is to be used as an anchor, mechanically-based anchoring may be appropriate to prevent movement perpendicular to the primary axis A of the structure 600. However, there remain two potential force directions, indicated by arrows F1 and F2, for which mechanical anchoring is inappropriate as the fabric 602 can ride up or down the structure 600 to at least some extent.

In a first direction F1, compression-based anchoring could be used. That is, by forming a tight sleeve-like fabric 602 fit around the structure 600, it would be very difficult to cause displacement of the fabric 600 in the direction of the first force direction F1.

Figure 6B:
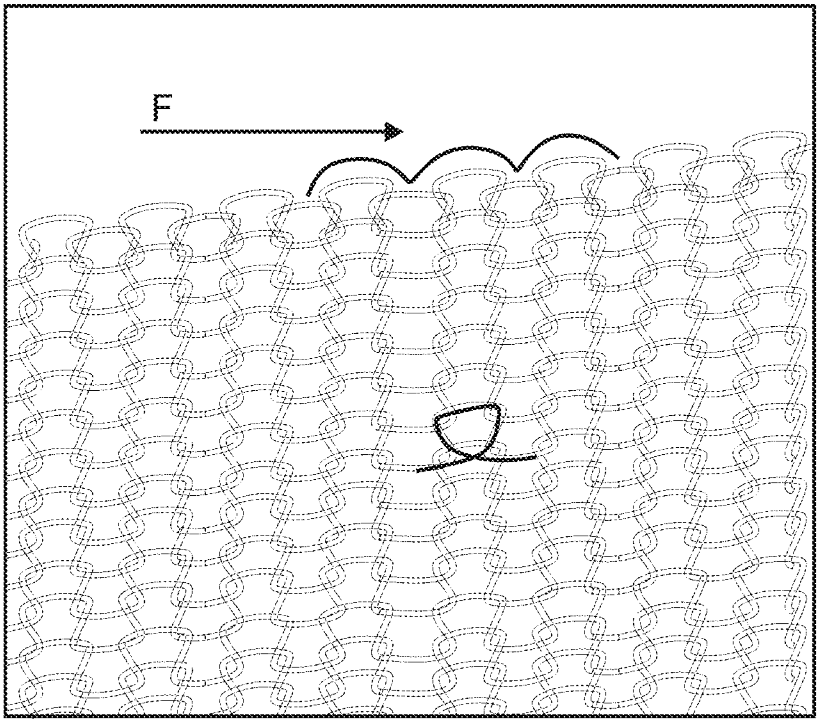
Figure 6C:
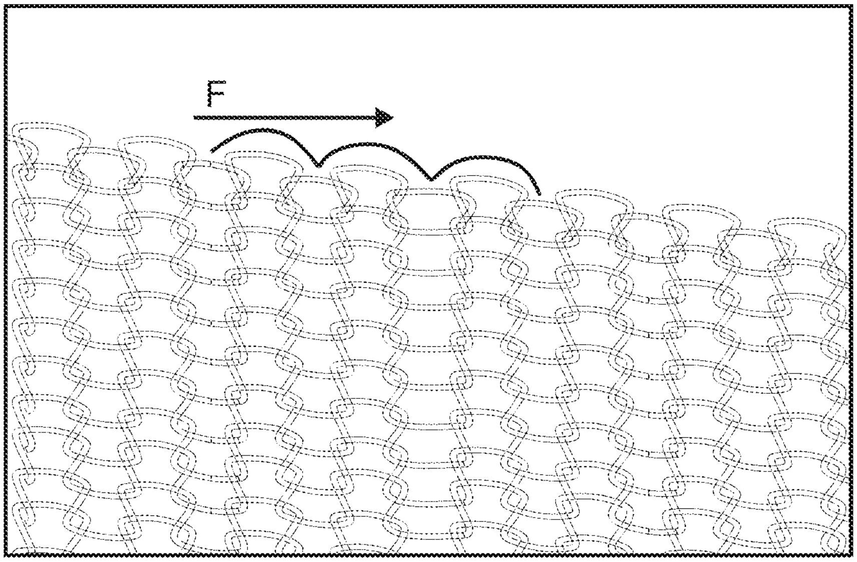

In the second direction F2, however, compression-based anchoring is only marginally helpful. While compression does provide some increased anchoring to the structure 600, several failure modes for a good anchor are possible. First, the fabric could slide off relatively easily if there is not an adequate bond between structure 600 and fabric 602. Additionally, the fabric itself can rumple, fold, or crush in a way that would not be seen when pushing in the F1 direction. In the F2 direction, there is no backing support from the structure 600 itself to keep the shape of the fabric, and these deformations within the structure of the fabric 602 itself are more likely. One way to enhance the usability of an active fabric 602 based on a knitted pattern for friction-based anchoring is to orient the fibers such that the tips of each knitted loop are pointed into the direction of the expected force, as shown in FIGS. 6B and 6C.

Figure 6D:
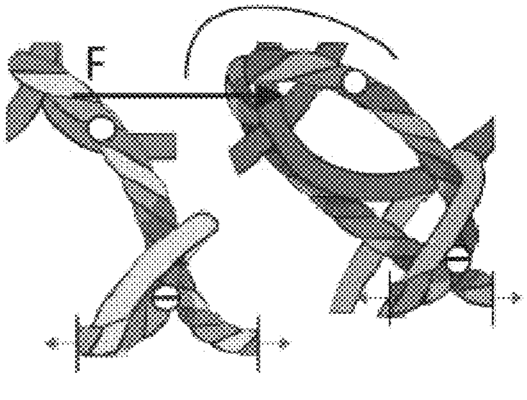
Figure 6E:
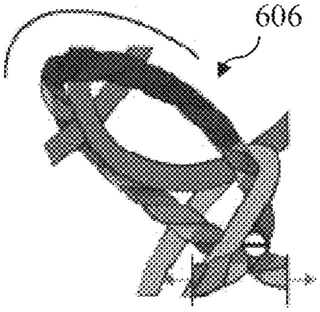

Orienting the loops as shown in those drawings produces maximum textile-body friction while maintaining low chance for intra-fabric deformations or displacement. Knitted structures inherently include a nap that has directionality to it and this nap can be used to enhance friction in a particular direction, as shown in FIG. 6D. By enhancing the rigidity of the loop tip 606 as shown in FIG. 6E, the overall strength of the loop (and, by extension, the fabric 602) can be enhanced. In embodiment, a high-friction coating could be added to the loop at the apex and side as shown in FIG. 6E at 606 to increase friction in the shear force direction. It should be understood that while frictional anchoring is enhanced by arranging each of the plurality of loop tips of each of the knitted row such that they are oriented towards the narrower end of a frustoconical fabric, the tips could (and likely will) be pointed somewhat off of 0° during transition between states, or due to the fundamentally malleable nature of fabrics and knit patterns in response to underlying movement or applied forces.

In addition to stress and strain resistance provided by this orientation, the knit pattern depicted herein creates a corrugated pattern against the structure (e.g., 600). In embodiments where the structure 600 is a human body or other conformable structure, these corrugations can provide enhanced hold. The corrugations change the direction of normal force between the structure 600 and the fabric 602, such that the dot product of force F2 relative to the interface of the structure 600 and fabric 602 is reduced in areas.

Figure 6F:
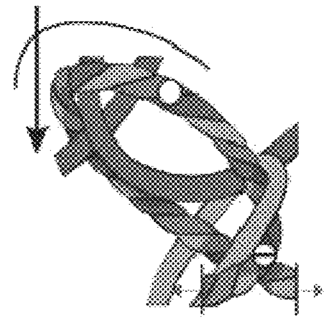
Figure 6G:
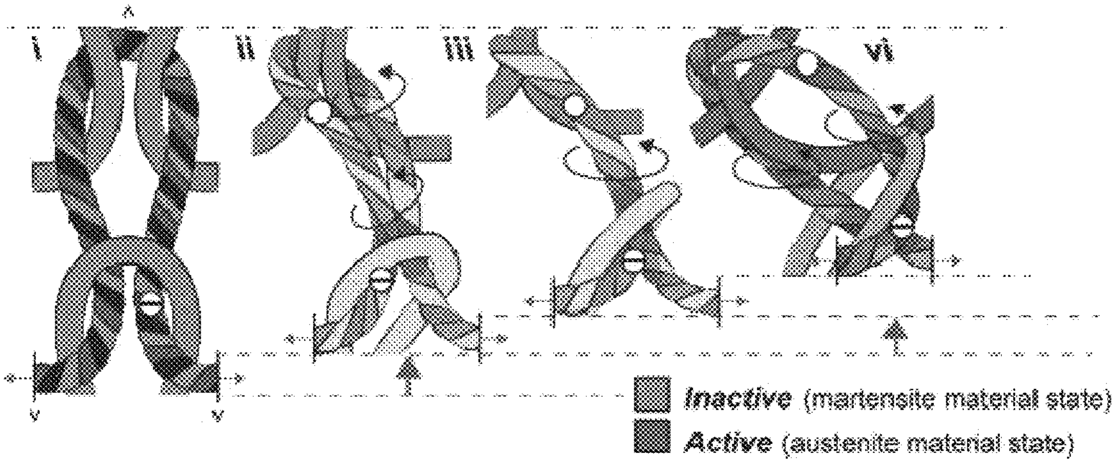

FIG. 6F shows a direction of force in which the loop has lower shear resistance. As shown in FIGS. 6E and 6F, then, active textiles can perform structurally anisotropic actuation contraction in two different orientations, enabling 3D systems to accomplish discrete tasks in perpendicular axes. FIG. 6G shows the overall loop formation as the material changes from inactive (martensite) state to active (austenite) state, with reference marks ○ and θ showing the movement of particular portions of the fiber throughout the transition. From this diagram, it is possible to coat or treat portions of the loops as desired to enhance friction anchoring. In embodiment it may be desirable to coat only some portion of the material, while leaving the remainder of the fiber in fabric 702 untreated, so as to avoid changing the mechanical properties of the structure in other ways (e.g., reducing overall displacement or variable recruitment characteristics).

Figure 7A:
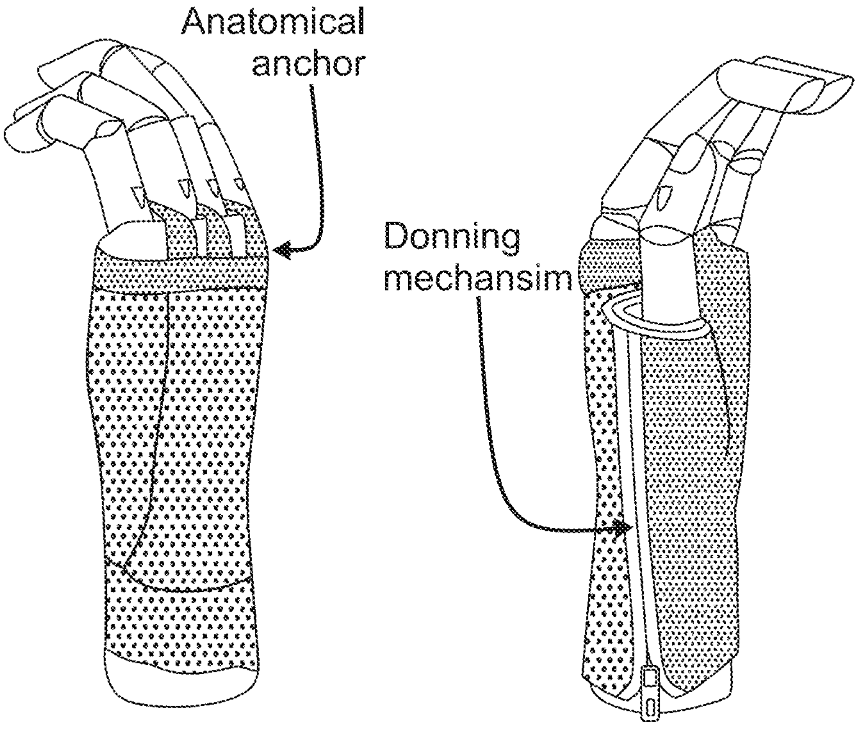
FIGS. 7A-7D show an embodiment of a friction-based anchoring system for a wrist.
Figure 7B:
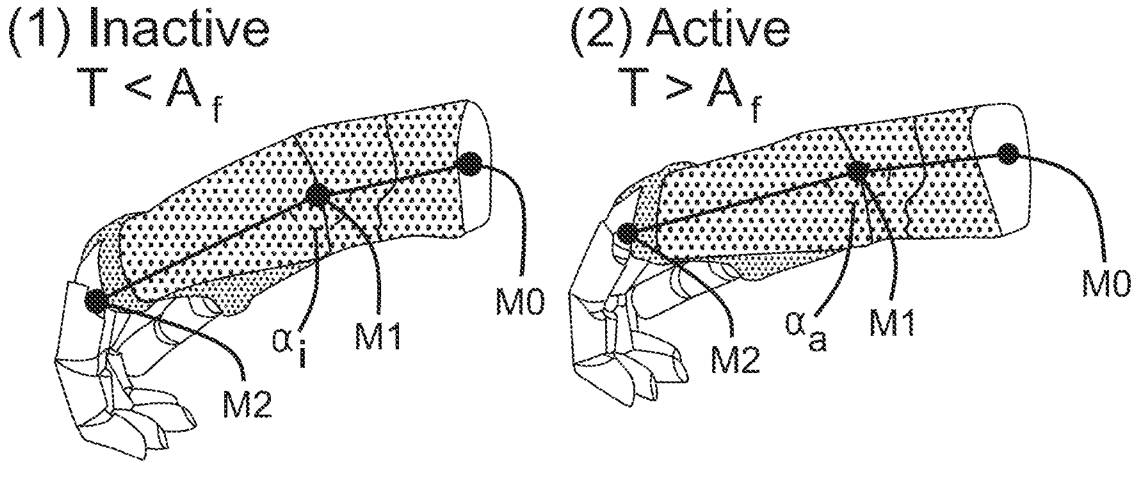

In one example, an assistive wrist sleeve (FIG. 7A) is designed to provide motion assistance to the wrist joint by lifting the hand from a natural, flexed position to a neutral position upon actuation (FIG. 7B). Extension of the wrist is primarily driven by actuation contraction along the dorsal length of the hand and wrist, which lifts the hand from a flexed position (associated with a longer dorsal length) to a neutral position (associated with a shortened dorsal length). To translate dorsal length actuation contraction of the active textile glove to a change in wrist angle, the glove must be anchored, proximally and distally, to the body. In prior wearable robotic demonstrations, anchoring around the body has been accomplished with passive, adjustable straps and braces that increase device complexity and discomfort. Here, dynamic anchoring is provided around the body with a multifunctional and structurally anisotropic active textile that can contract circumferentially around the conical volume of the low wrist and, at the same time, lift the weight of the hand. While the finger gussets of a glove provide simple mechanical anchoring distally, shifting proximal anchoring to a dynamic and impermanent mechanism improves device wear comfort and usability. For contractile systems that generate forces around the body and/or lift loads (e.g., the hand), system patterns are developed around active textile dimensions under a fixed actuator strain and/or an applied load. Active material state system dimensions are consequently smaller than the body dimensions.

Figure 7C:
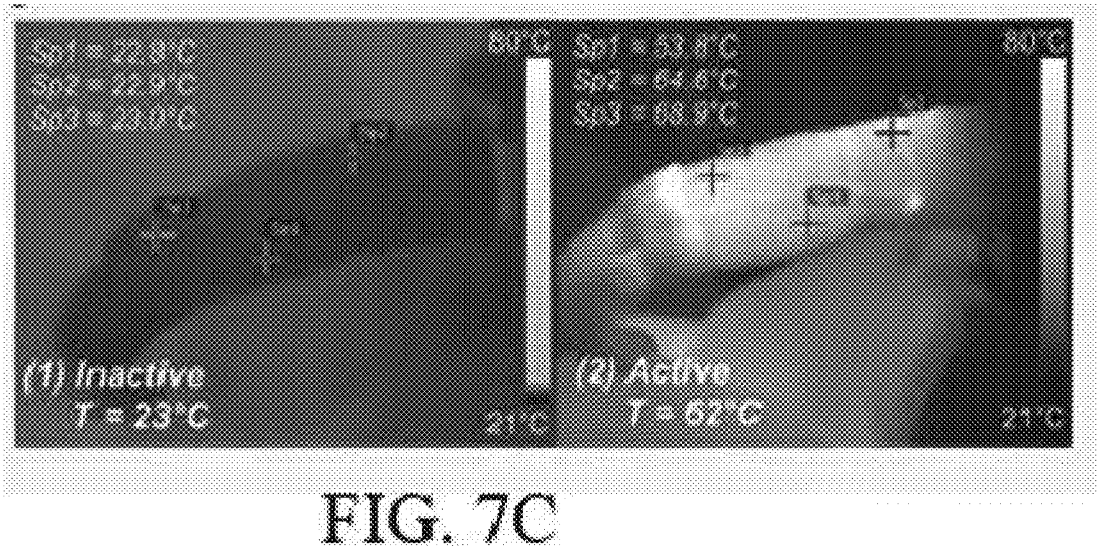
Figure 7D:
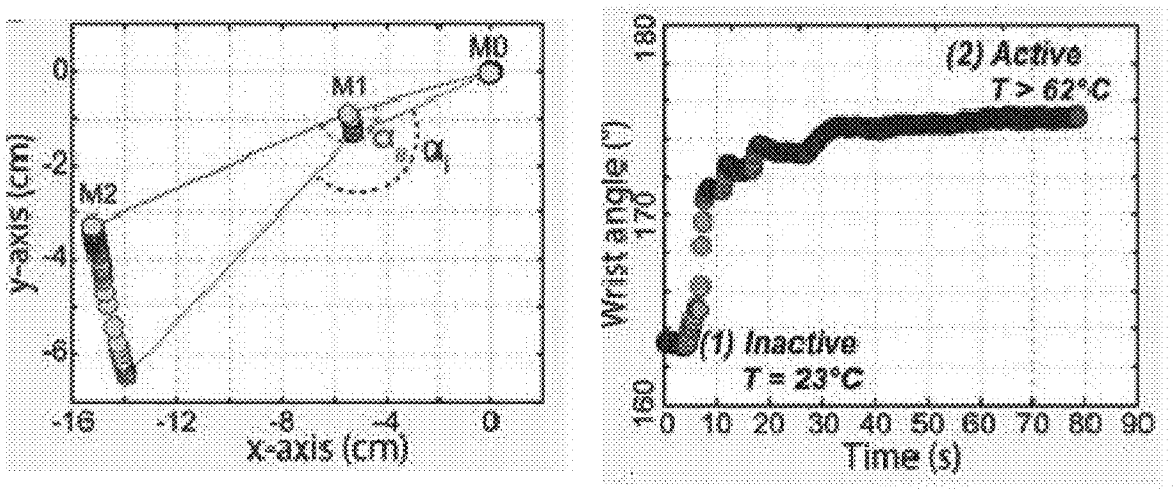

The assistive wrist sleeve was characterized through a standard motion tracking analysis. In an inactive material state (T<Mf), the wrist fell under the weight of the hand, producing an inactive angle, αi, between marker points M0, M1, and M2 (FIG. 7B). Upon actuation of the topmost region of the wrist sleeve (T>Af), the sleeve contracted to anchor around the wrist and simultaneously lifted the hand, producing an active angle, αa (FIG. 7B). FIG. 7C depicts the results of infrared imaging analysis used to characterize thermal loading, which was accomplished with a standard heat gun. The assistive wrist sleeve was found to produce a wrist angle change of 12° (FIG. 7D). The flexed angle of the wrist while the device was in an inactive material state (αi) was 163°. Device actuation produced a maximum angle extension (αa) of 175°. The results demonstrate successful use of structurally anisotropic actuation within a system, as the change in wrist angle could only be accomplished with both longitudinal contraction and distal dynamic anchoring to translate contraction to hand lift.

Force Vectoring

Once an appropriate anchor location/position is established, the force generated by an SMA system can be oriented or vectored appropriately to enable the desired actuation while simultaneously avoiding discomfort or mobility restriction of the wearer. This process is referred to as force vectoring. Embodiments include user-controllable devices, in which the degree and timing of actuation is controlled by the user.

Figure 8A:
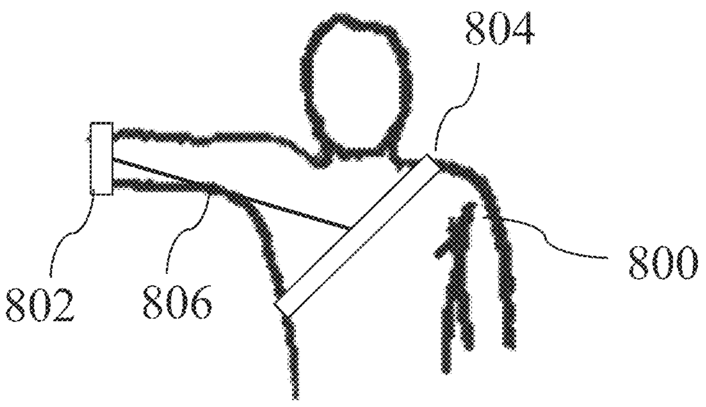
FIGS. 8A and 8B depict a garment having a portion in an un-contracted (non-anchored) and contracted state (anchored, tensioned) state, according to a garment with transient anchoring capability.
Figure 8B:
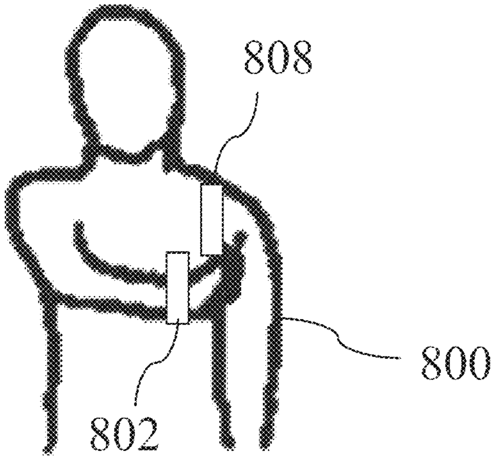

One example of force vectoring is depicted in FIGS. 8A and 8B. These two drawings show a torso that is covered by a garment 800. As shown in FIG. 8A, garment 800 includes a first anchor point 802, a second anchor point 804, and a connecting yarn 806. Each of the first and second anchor points 802 and 804 are provided by application of sufficient compression across a closed loop in this embodiment. It should be understood, however, that in alternative embodiments one or more anchor point of garment 800 could be based upon a specific anatomical anchoring point, as described in more detail above.

Yarn 806 extends between the anchoring points 802 and 804. Yarn 806 can be a shape memory or other actuatable structure that assists with the arm movement between extended (as shown in FIG. 8A and unextended (as shown in FIG. 8B). By actuating the yarn 806, force is applied to bring in the arm of the wearer of garment 800. Yarn 806 can be positioned within the garment 800, or in some embodiments it can be deployable from the garment 800 to form a direct route (or relatively more direct route) therebetween by the user. For example, yarn 806 could be a filament passing through the knit pattern of the garment 800, or alternatively yarn 806 could be releasably attached to garment 800 such that it does not provide any obstruction or impediment to mobility while in the relaxed state, and can be detached by the user when needed, such as to perform a specific movement or during a physical therapy session.

As shown in FIG. 8B, garment 800 is in the unextended position, and furthermore with a different set of anchor points. While the first anchoring point 802 is unchanged, the second anchoring point 808 is transient and has moved from a bandolier shape to the wearer's shoulder. By deploying active fibers that are separately actuatable throughout the garment 800, the location of the anchoring point can be adjusted as needed.

Assisting with this movement requires sufficient force that positioning anchors at positions that maximize torque (by increasing the lever arm and applying force directly parallel to the desired direction of movement) is desirable. Accomplishing these objectives without dynamic or transient anchoring would otherwise require anchors arranged on both the torso and the upper arm of garment 800. If those anchors were passive anchors, the upper arm anchor would either need an anatomical landmark to stay in place (for example, an inextensible full-length glove that reaches to the finger crotches) or would need to tourniquet the upper arm so tightly as to stay in place when pulled against (something the user would not enjoy for long). Transient anchoring achieves the tourniquet effect, temporarily and dynamically, so that the discomfort a user would feel would only be in the moment when flexion is achieved and could be relaxed thereafter.

Figure 9:
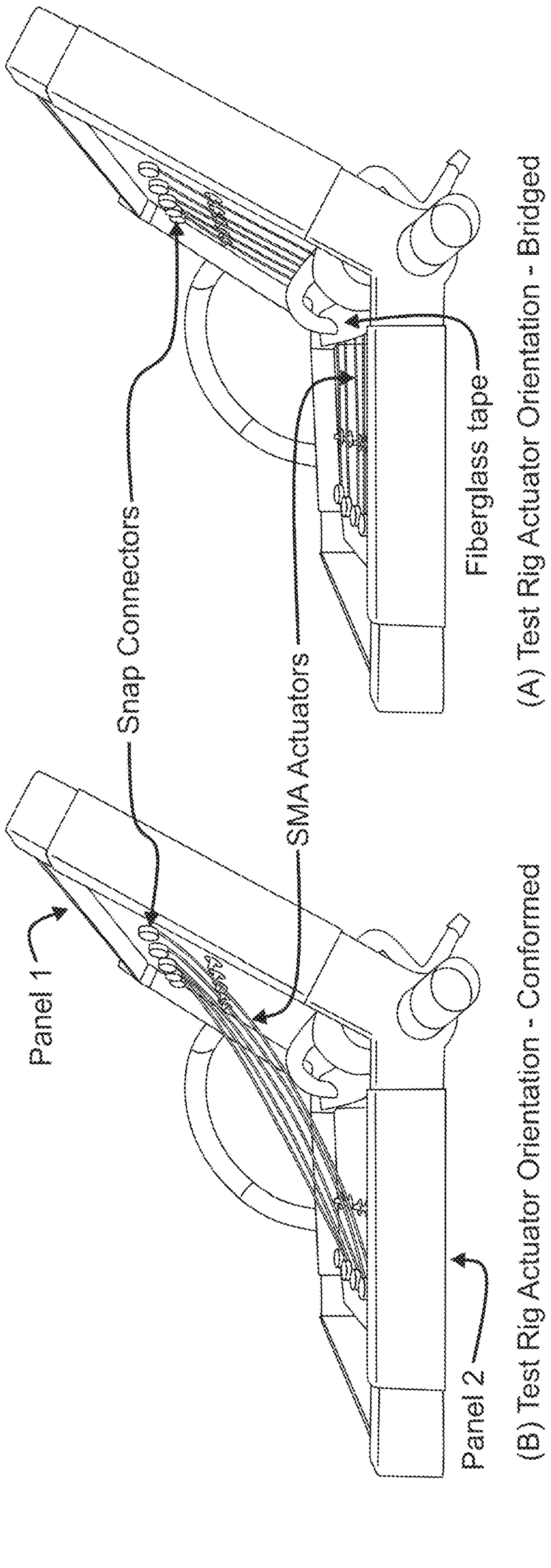
FIG. 9 depicts shape memory actuator geometries, according to two embodiments.

Anchors can be selected from any circumferential body location could serve as a temporary anchor point for an adjacent joint, irrespective of anatomical landmarks, providing greater flexibility in choosing where force is applied. As shown in FIG. 9, unconstrained (left) and constrained (right) actuation result in different levels of actuating force. The actuators on the left are free to gape away from the joint while they contract, whereas the actuators on the right are held tightly to the joint to preserve wearability. An embodiment normally has the form factor on the right (which is what the user would prefer for regular wearing) but could selectively take the form factor on the left (which is a far more functional torque generation orientation, though less wearable for the user). This type of temporary transformation could be achieved with a dynamic "anchor"—for example, a circumferential wrap as described in FIG. 8—that holds the actuators near the body when actuation is not needed, but relaxes when actuation is desired.

Transient anchoring is not the only mode of anchoring that can be used in such garments. In some embodiments, anatomical landmarks can still be used as anchors for some modes of operation, such as the torso/neck 804 in FIG. 8A. The actuator that relies on an anatomical landmark anchor for leverage can be connected in series with a variable stiffness fabric which is then connected to the anchor. When actuation is not desired, the variable stiffness fabric is left un-stiffened, so that the garment is comfortable and the range of motion of the arm/torso are not overly constrained by stiff fabrics. Then, when actuation is desired, the variable stiffness fabric is first stiffened, creating a viable loading pathway between the actuator and the anchor point, which would be functionally preferred but less comfortable to the wearer.

It should be understood that garments such as exosuits and exoskeletons including force vectoring features could be used for tasks such as assistance with lifting heavy objects that would not be possible to the wearer otherwise, for example. Furthermore, restraints on movement can be accomplished just as easily as assistance with movement, such that a single garment can provide splinting, casting, or other immobilizing features. Other uses could include providing automatic tourniquetting as needed, such as upon detection of blood or water, or upon detection of a vacuum in a space suit. Some "garments" that benefit from the improvements described herein are not wearable by a human whatsoever, but could include coverings for pipes, for example, that can also automatically tourniquet when exposed to liquid. In such embodiments, sensing can also be implemented within the fabric structure.

Tourniquetting is one specialized function that can be accomplished according to embodiments described herein. FIG. 10A depicts a cross-sectional view of a tourniquetting device 1000 in an unactivated state, while FIG. 10B depicts the same tourniquetting device 1000 in the activated state (i.e., constricted). In the loose state, device 1000 is loosely arranged around body 1002 (which could be, for example, a cross section of an arm, a leg or a torso). Device 1000 includes an active portion 1001, which can be powered, or can be activated by temperature, to contract. Upon contraction of active portion 1001, as shown in FIG. 10B, the device 1000 is tight to the exterior of the body 1002. In some embodiments, the device 1000 is not only in direct contact with body 1002, but in fact the active portion 1001 can be customized to exert a predefined quantity of pressure on the body 1002 that restricts blood flow within the body 1002, or prevents fluid flow (such as air or water) between body 1002 and garment 1000.

Figure 11:
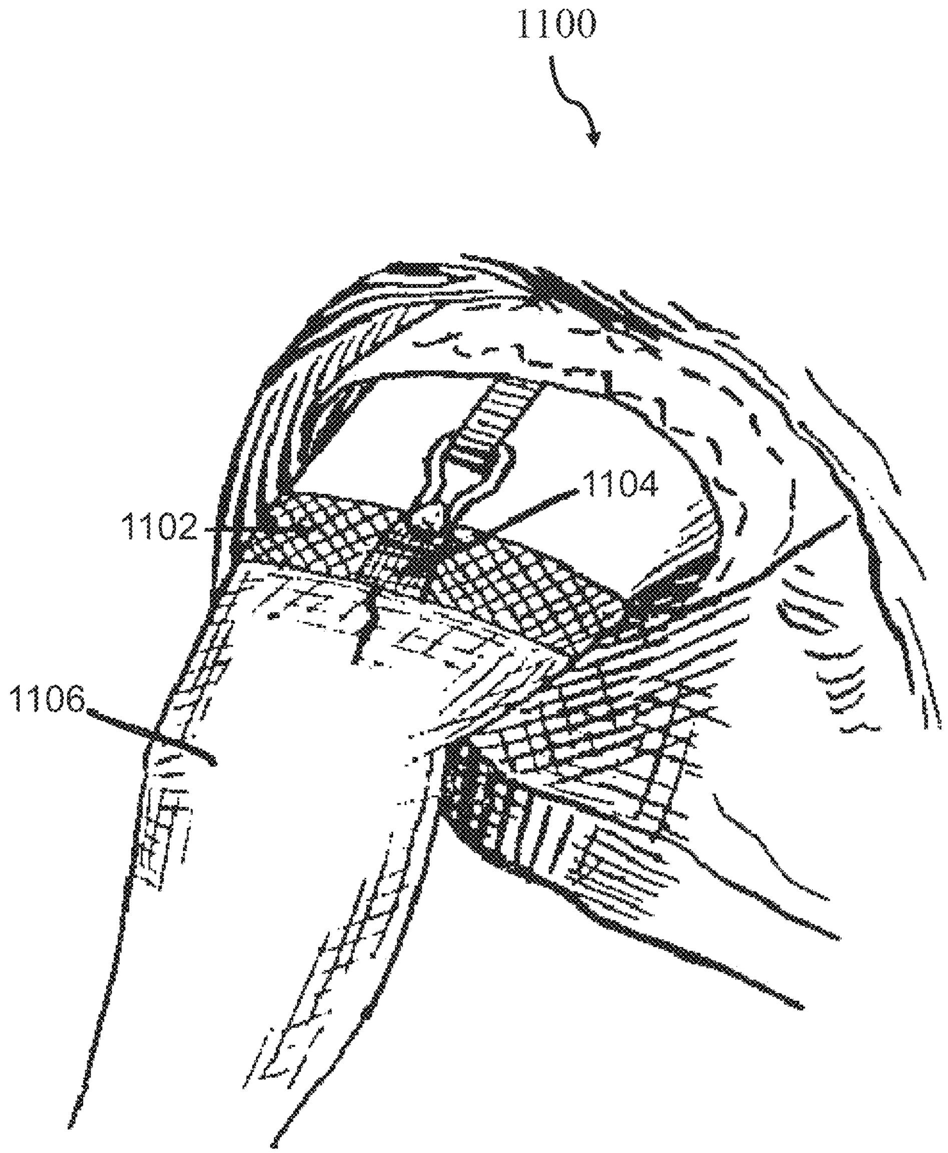
FIG. 11 depicts an active garment according to another embodiment.

Force vectoring also includes selective actuation of a shape-memory component coupled to an anthropomorphic or fixed anchor. For example, as shown in FIG. 11, a garter 1100 includes a belt 1102, straps 1104, and stockings 1106. While conventional garter belts may hold stockings 1106 to the anthropomorphic, fixed anchor point provided by the belt (i.e., the wearer's waist), the physical relationship between them is based entirely upon the length and possibly elasticity of the straps 1104. However, in an active embodiment, straps 1104 could be selectively engageable shape memory or other active materials, such that the quantity of force drawing stockings 1106 towards belt 1102 is variable.

It will be clear from this example that, in some embodiments, physical therapy garments could be created in which straps 1104 provide assistance lifting the leg, or straps 1104 could be used between garments or portions thereof in a variety of positions on the wearer to provide dynamic force vectoring. In embodiments such as the one shown in FIG. 11 the anchors themselves need not be dynamic, but rather the connectors between other fixed anchor points can be actuated selectively.

Selective Control

In various embodiments, leads or knit patterns can be used that incorporate filaments or wires to create conductive pathways, such that a user can cause contraction at particular portions of the garment to result in shifting anchoring. Garments incorporating shape memory features can also be combined with, for example, pneumatic garments. In embodiments, it may be preferable to have pneumatic control for lifting or other motions parallel the expected direction of gravity, while shape memory assists with movement that is orthogonal to the expected direction of gravity. By selectively activating each type or location of compression, dynamic anchoring can be accomplished. Distributed elements that create the temporary anchors can access power and control signals through any traditional e-circuitry manufacturing approach.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one embodiment," "an embodiment," or "some embodiments" means that a particular feature, structure, or characteristic, described in connection with the embodiment, is included in at least one embodiment of the teaching. The appearances of the phrase "in one embodiment" in various places in the specification are not necessarily all referring to the same embodiment.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

We claim:

1. A system comprising:

a first anchor portion configured to be coupled to a first underlying structure;

a second anchor portion configured to be coupled to a second underlying structure; and a coupler arranged between the first anchor portion and the second anchor portion, wherein the first underlying structure and the second underlying structure each comprise a portion of a body, wherein the first anchor portion forms a part of a first garment, wherein the second anchor portion forms another part of a second garment, wherein at least one of the first anchor portion and the second anchor portion is a friction-based anchor comprising: a frustoconical section of knitted material extending from a first end to a second end, the frustoconical section comprising: a first end having a cross-sectional area and a second end having a second cross-sectional area, wherein the cross-sectional area of the first end is smaller than the cross-sectional area of second end; a plurality of knitted rows of an active material, each of the knitted rows defining a corresponding closed ring about the frustoconical section; wherein each of the corresponding closed rings has a martensite diameter and an austenite diameter based upon the active material and a knit pattern; and wherein each of the knitted rings is arranged along a knit pattern such that a plurality of loop tips of each of the knitted rings is oriented towards the first end.

2. The system of claim 1, wherein each of the loops of the friction-based anchor further comprises a high-friction coating.

3. The system of claim 2, wherein the high-friction coating is applied to only a portion of the corresponding closed rings, the portion including the plurality of loop tips.

4. The system of claim 1, wherein the coupler comprises an actuatable strap.

5. The system of claim 4, wherein the actuatable strap comprises a shape memory material.

6. The system of claim 1, wherein at least one of the first anchor portion and the second anchor portion is a dynamically actuatable anchor.

7. The system of claim 6, wherein the dynamically actuatable anchor can be actuated on demand by a user to temporarily tighten strategic regions of a garment.

8. The system of claim 7, wherein the garment is an exosuit.

9. The system of claim 7, wherein the garment is a physical therapy garment.

10. The system of claim 6, wherein the dynamically actuatable anchor can be automatically actuated to temporarily tighten strategic regions of a garment.

* * * * *